US012551791B2

(12) United States Patent
Schembri et al.

(10) Patent No.: US 12,551,791 B2
(45) Date of Patent: Feb. 17, 2026

(54) GRAPHICS DATA PROCESSING

(71) Applicant: Sony Interactive Entertainment Inc., Tokyo (JP)

(72) Inventors: Danjeli Schembri, London (GB); Oliver Hume, London (GB); Matthew Sanders, London (GB); Fabio Cappello, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 144 days.

(21) Appl. No.: 18/058,311

(22) Filed: Nov. 23, 2022

(65) Prior Publication Data

US 2023/0158403 A1 May 25, 2023

(30) Foreign Application Priority Data

Nov. 25, 2021 (GB) ...................................... 2117030

(51) Int. Cl.
*A63F 13/52* (2014.01)
*A63F 13/25* (2014.01)

(52) U.S. Cl.
CPC .............. *A63F 13/52* (2014.09); *A63F 13/25* (2014.09); *A63F 2300/538* (2013.01)

(58) Field of Classification Search
CPC ................................. A63F 13/52; A63F 13/25
See application file for complete search history.

(56) References Cited

U.S. PATENT DOCUMENTS

2015/0054833 A1 2/2015 Kaminski
2018/0330480 A1* 11/2018 Liu ......................... G06T 15/04

OTHER PUBLICATIONS

Combined Search and Examination Report for corresponding GB Application No. 2117030.3, 10 pages, dated Jul. 18, 2022.
"Unity—Manual: Quality" Unity Technologies, URL: https://web.archive.org/web/20211115122033 https://docs.unity3d.com/Manual/class-QualitySettings.html, 15 pages, Nov. 15, 2021 (for relevancy see Non-Pat. Lit. #1).
Extended European Search Report for corresponding EP Application No. 22209223.1, 9 pages, dated Mar. 3, 2023.
"Unity—Manual: Quality" Unity Technologies, URL: https://web.archive.org/web/20211115122033 https://docs.unity3d.com/Manual/class-QualitySettings.html, 17 pages, Nov. 15, 2021 (for relevancy see Non-Pat. Lit. #1 submitted Nov. 23, 2022).
Communication Pursuant to Article 94(3) for corresponding application No. EP22209223.1, dated Sep. 22, 2025, 9 pages.

* cited by examiner

*Primary Examiner* — Yingchuan Zhang
(74) *Attorney, Agent, or Firm* — Kilpatrick Townsend & Stockton LLP

(57) ABSTRACT

A data processing apparatus includes storage circuitry to store graphics data for a first device, receiving circuitry to receive second device information indicative of one or more properties for a second device with one or more different capabilities to the first device, control circuitry to reduce a quality of at least one aspect of the graphics data in dependence upon the second device information to obtain modified graphics data and output circuitry to output the modified graphics data, where the control circuitry is configured to reduce a quality of the at least one aspect according to a predetermined quality level from a plurality of predetermined quality levels for the at least one aspect, the predetermined quality level identified in dependence upon the second device information.

19 Claims, 3 Drawing Sheets

GRAPHICS DATA PROCESSING

BACKGROUND OF THE INVENTION

Field of the Disclosure

The present disclosure relates to graphics data processing.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior against the present disclosure.

Software applications are typically designed for execution by one or more hardware devices that are in use, or soon to be in use, at the time of writing the software application. An example of this is a video game that is specifically written to utilise the processing resources of a latest version of a game console. With each generation of game console, a number of video games are typically designed to fully utilise the improved capabilities and thereby provide more advance gaming than was achievable with earlier generation devices. As such, software applications are typically designed according to one or more hardware specifications for one or more widely used devices at the time of writing the application. However, this can be problematic in that devices having different capabilities may not be capable of running the program with a suitable performance or may even be unable to execute the software application. For example, a processing device having a lower hardware specification may not be able to execute an application written for a higher specification device or may not be able to execute the application with an acceptable level of performance.

It is an aim to improve usability of content for devices having different capabilities.

It is in the context of the above arrangements that the present disclosure arises.

SUMMARY OF THE INVENTION

It is to be understood that both the foregoing general description and the following detailed description are exemplary, but are not restrictive, of the invention.

In a first aspect, a data processing apparatus is provided in accordance with claim 1.

In another aspect, a data processing method is provided in accordance with claim 17.

In another aspect, computer software is provided in accordance with claim 18

Various aspects and features of the present disclosure are defined in the appended claims and within the text of the accompanying description. Example embodiments include at least a system, a method, a computer program and a machine-readable, non-transitory storage medium which stores such a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
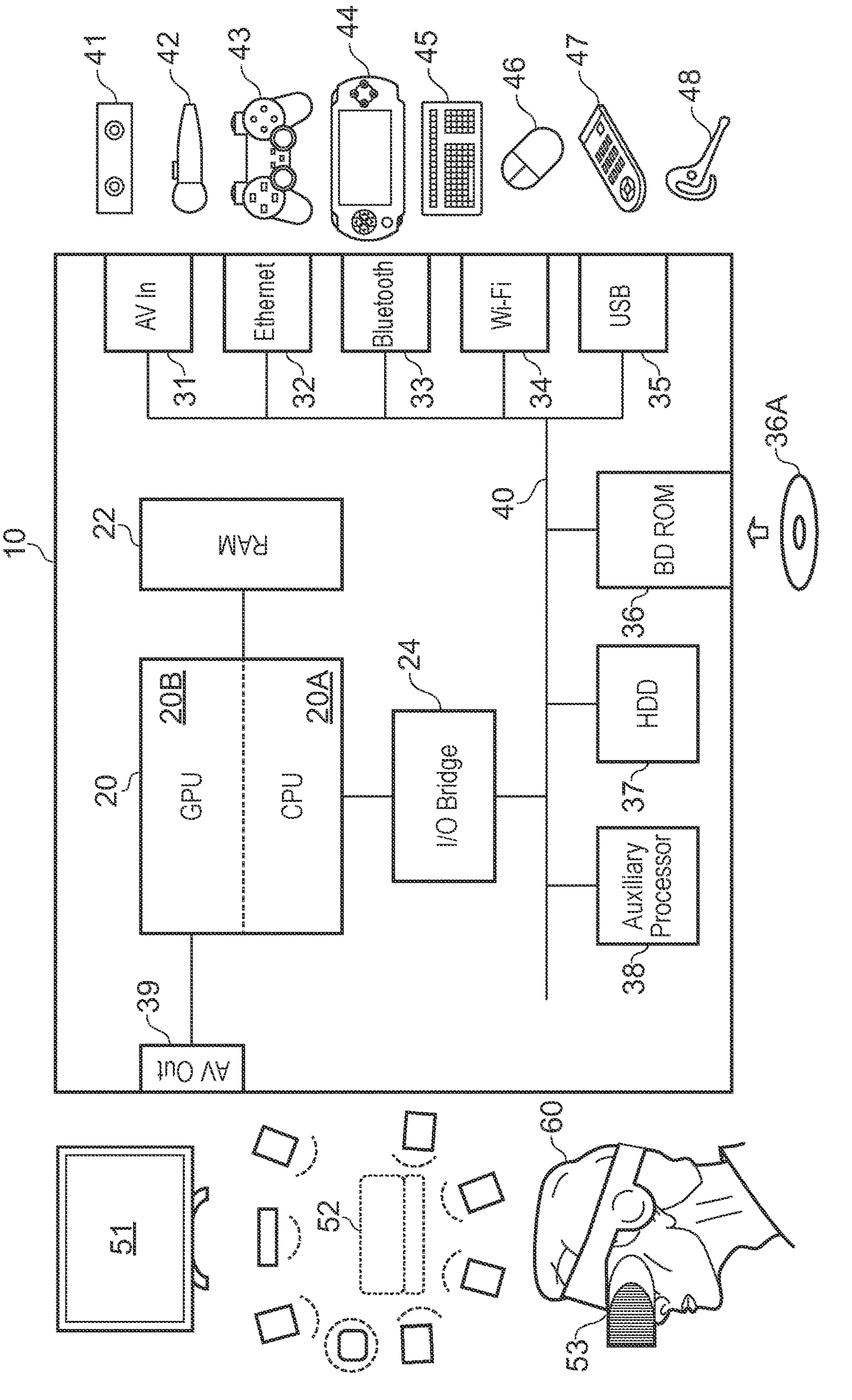
FIG. 1 is a schematic diagram illustrating a computer game processing apparatus.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a data processing apparatus suitable for processing graphics data associated with a content, such as a video game, to generate images of the content for display.

During development of a content, one or more aspects of the content are typically designed according to data processing specifications of one or more processing devices so as to utilise available processing resources and provide the most advanced and feature rich content. An example of this is the release of new video games. With each game console generation, the provision of greater processing resources leads to more advanced video games designed to utilise the available processing resources. However, this can cause compatibility issues when attempting to run the video game on another game console having different capabilities.

The operations to be discussed below relate to techniques for improving usability of graphics data for a content by processing devices having different capabilities.

Figure 2:
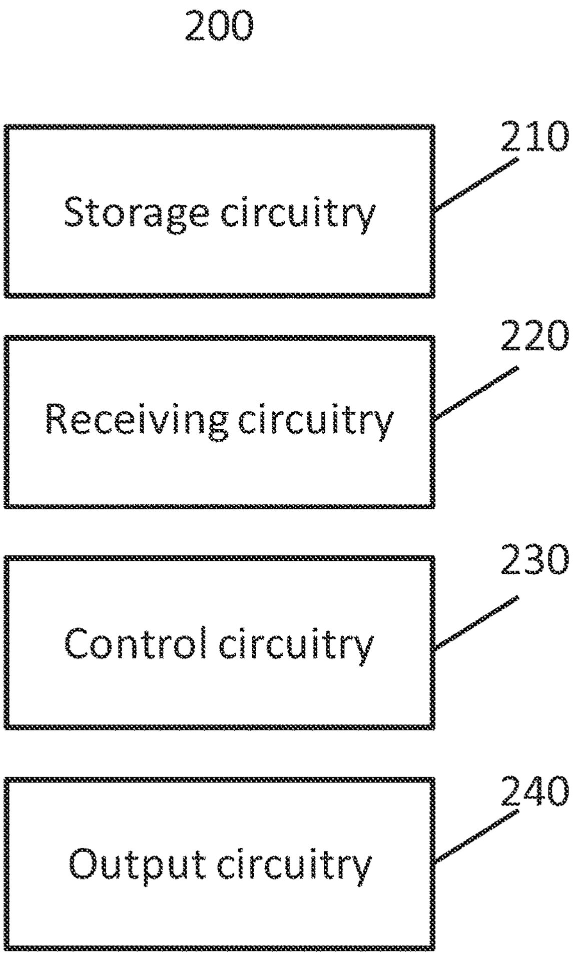
FIG. 2 is a schematic diagram illustrating a data processing apparatus.

FIG. 2 schematically illustrates a data processing apparatus 200 for improving usability, by at least a second device, of graphics data created for a first device.

In embodiments of the disclosure, the data processing apparatus 200 comprises: storage circuitry 210 to store graphics data for a first device; receiving circuitry 220 to receive second device information indicative of one or more properties for a second device with one or more different capabilities to the first device; control circuitry 230 to reduce a quality of at least one aspect of the graphics data in dependence upon the second device information to obtain modified graphics data; and output circuitry 240 to output the modified graphics data, wherein the control circuitry 230 is configured to reduce a quality of the at least one aspect according to a predetermined quality level from a plurality of predetermined quality levels for the at least one aspect, the predetermined quality level identified in dependence upon the second device information.

The data processing apparatus 200 may for example be provided as part of a processing device such as that shown in FIG. 1, or as part of a general purpose computing device. Alternatively, the data processing apparatus 200 may be provided as part of a server, such as a content distribution server for distributing content to user devices (e.g. personal computers or game consoles).

The storage circuitry 210 is configured to store graphics data for a content item that has been created for a first device. The storage circuitry 210 may comprise any suitable memory capable of storing data for a content item, such as a video game, so as to store at least the graphics data associated with the content item. For example, the storage circuitry 210 may store at least the graphics data associated with one or more respective video games. In some examples, the storage circuitry 210 can be configured to store first graphics data associated with a first content and second graphics data associated with a second content. Hence more generally, the storage circuitry 210 can be configured to store graphics data for one or more respective content items.

Graphics processing operations typically comprise processing of predefined graphical data in accordance with a graphics processing pipeline to generate image data for rendering data for display as an image frame. Such graphics processing operations can be performed by a processing unit, such as the GPU 20B and/or CPU 20A in FIG. 1.

For an image frame including a plurality of features, the image data comprises first data for a first feature in the image frame and second data for a second feature in the image frame, in which the first data is obtained by performing graphics processing operations using graphics data defining one or more geometric and visual characteristics for the first feature and the second data is obtained by performing graphics processing operations using graphics data defining one or more geometric and visual characteristics for the second feature.

In many image rendering processes, meshes are used to represent objects and textures can be applied to these meshes to apply image details to the mesh during rendering. For example, the graphics processing operations performed by a processing unit may comprise one or more geometric processing operations and one or more shader processing operations for operating on the vertices of a polygonal mesh to generate image data for an object on the basis of the input polygonal mesh data. A step of vertex specification may be performed to setup a list of vertices associated with an object for inputting to a graphics processing pipeline. Vertex shader and geometry shader processing operations may then be performed for the vertices followed by steps of primitive assembly and rasterization in order to generate output data for the given object. Graphics processing operations performed by a processing unit may further comprise one or more operations for applying one or more textures to a mesh. The image data generated for an image frame thus comprises data for the respective objects included the image frame, including data indicative of the geometric characteristics and visual characteristics of the object in the image frame.

Hence more generally, the graphics data for a content comprises mesh data and texture data for defining one or more visual characteristics for one or more features. The graphics data for a content thus represents data that is to be processed by a given processing device to generate image data for the content.

The storage circuitry 220 stores the graphics data that has been created for use by a first information processing device having a first capability. The receiving circuitry 220 is configured to receive second device information indicative of one or more properties for a second device with one or more different capabilities to the first device (e.g. different processing capabilities and/or different storage capabilities). The data processing apparatus 300 thus stores the graphics data and performs one or more processing operations to modify the graphics data in one or more ways by reducing a quality of the graphics data in one or more ways so that the graphics data can be modified to be better suited for use with the second information processing device.

The receiving circuitry 220 can be configured to receive the second device information via a wired or wireless communication (e.g. WiFi® or Bluetooth®) with the second device. For example, the second device may be configured to transmit one or more messages to the data processing apparatus 200 to request a content (or more specifically to request the graphics data for a content). As part of the request (or as part of another message), the second data processing device may transmit information indicative of one or more properties for the second device. Examples of the one or more properties of the second device which are indicated by the second device information will be discussed in more detail later. In some examples, the data processing apparatus 200 may be provided as part of a server and the second device may be a user device such as a game console or smart phone.

In some examples, the receiving circuitry 220 may receive the second device information from a server, such as a content distribution server. For example, a server such as a content distribution server can communicate device information indicative of one or more device properties for a given device to the data processing apparatus 220 to thereby request modified graphics data for the given device.

Hence more generally, the receiving circuitry 220 is configured to receive device information for a second device having different capabilities to the first device, and the control circuitry 230 is configured to perform one or more processing operations for modifying a quality of one or more aspects of the graphics data in dependence upon the received device information so as to reduce a quality of at least one aspect of the graphics data.

The control circuitry 230 is thus configured to reduce a quality of at least one aspect of the graphics data in dependence upon the second device information to obtain modified graphics data, such that the modified graphics data differs from the original graphics data in that at least one aspect of the modified graphics data has a reduced quality with respect to the initial graphics data that has been created for use with the first device.

The control circuitry 230 is configured to reduce a quality of the at least one aspect of the graphics data according to a predetermined quality level from a plurality of predetermined quality levels for the at least one aspect, the predetermined quality level identified in dependence upon the second device information. The control circuitry 230 can be configured to reduce the quality of the at least one aspect using any of the plurality of predetermined quality levels for the at least one aspect, in which each of the plurality of predetermined quality levels corresponds to a different level of quality for the at least one aspect. The plurality of predetermined quality levels comprises at least a first predetermined quality level and a second predetermined quality level corresponding to different respective levels of quality for the at least one aspect. It will be appreciated that the number of predetermined quality levels for the at least one aspect is not particularly limited. The plurality of predetermined quality levels are provided for the at least one aspect of the graphics data and define one or more properties (or reference properties) for the at least one aspect which can be used as a reference by the control circuitry 230 for adjusting the at least one aspect to reduce a quality thereof. As such, a respective predetermined quality level can be identified on the basis of one or more of the properties of the second device information, and the respective predetermined quality level can be used as a reference by the control circuitry 230 to reduce a quality for at least one aspect of the graphics data.

In some examples, the control circuitry 230 is configured to reduce a quality level associated with a first aspect of the graphics data and to reduce a quality level associated with a second aspect of the graphics data, to thereby obtain the modified graphics data, according to the predetermined quality level identified from the plurality of predetermined quality levels. At least some of the plurality of predetermined quality levels may define one or more properties associated with a first aspect of graphics data and one or more properties associated with a second aspect of the graphics data, such that at least some of the plurality of predetermined quality levels can be used as a reference by the control circuitry 230 to reduce a quality for the first aspect and the second aspect of the graphics data. Hence more generally, the plurality of predetermined quality levels can be used by the control circuitry 230 to reduce a quality for one or more aspects of the graphics data.

The output circuitry 240 is configured to output the modified graphics data obtained by the control circuitry 230. As explained above, the modified graphics data can be output to directly to the second device via a wired or wireless communication, or may be output to the second device via one or more intermediate processing devices. Alternatively, the modified graphics data can be output to a content distribution server that previously communicated device information to the data processing apparatus 200.

As such, the data processing apparatus 200 stores initial graphics data (also referred to as original graphics data) for a first device, adjusts a quality of one or more aspects of the initial graphics data according to device information received by the receiving circuitry 220, and outputs the modified graphics data for subsequent use by a device having one or more different capabilities to the first device. Whilst the following discussion refers to outputting the modified graphics data to the second device, it will be appreciated that the data processing apparatus 300 can be configured to output modified graphics data to any number of data processing devices, in which the graphics data has been modified according to device information received for each device. For example, the data processing apparatus 300 can be configured to receive second device information indicative of one or more properties for a second device and to receive third device information indicative of one or more properties for a third device, the second and third devices having one or more different capabilities to the first device. The initial graphics data for the first device can be modified for the second device to obtain modified graphics data for output to the second device and the initial graphics data for the first device can also be modified for the third device to obtain modified graphics data for output to the third device.

The control circuitry 230 can be configured to reduce a quality of at least one aspect of the graphics data, in which the at least one aspect comprises one or more from the list consisting of: a resolution of a polygonal mesh; a resolution of a texture; and a rendering rate at which image frames are to be rendered based on the graphics data. The one or more aspects for which quality can be reduced by the control circuitry 230 are discussed in more detail later.

In some embodiments of the disclosure, each of the plurality of predetermined quality levels for the at least one aspect corresponds to a different predetermined hardware specification. The plurality of predetermined quality levels correspond to different hardware specifications such that a first predetermined quality level is provided for a first hardware specification and a second predetermined quality level is provided for a second hardware specification. As such, the first predetermined quality level (or the second predetermined quality level) can be used by the control circuitry 230 for modifying the original graphics data to obtain a modified version of the original graphics data, and the modified graphics data has at least one aspect that is reduced in quality so that the modified graphics data is better suited for use by the first hardware specification (or the second hardware specification) than the original graphics data. Hence, a plurality of predetermined quality levels are set in advance and correspond to respective predetermined hardware specifications, such that one or more properties specified by a given quality level for an aspect of graphics data have a quality that is suitable for use with the corresponding hardware specification for that level. Relationships between such properties and hardware specifications are determined in advance for different hardware specifications based on one or more known performance metrics for a hardware specification. For example, performance metrics such as GPU speed, CPU speed and/or memory bandwidth, among other hardware properties, can be used for estimating a quality of an aspect of graphics that is suitable for that hardware specification. In some examples, a quality of an aspect of graphics that is suitable for a hardware specification may be specified in (or derivable from) a manufacturer's documentation, or may be determined through measuring one or more performance criteria for a device when running a test application comprising graphics processing operations. For example, stress testing may be used to gradually increase a quality of an aspect associated with graphics data for a given hardware specification until one or more processing errors arise and/or the processing within a given time constraint is no longer achievable. In this way, a threshold quality for an aspect of graphics data can be identified for a given predetermined hardware specification.

The predetermined hardware specifications corresponding to the respective quality levels each correspond to a hardware specification for which a quality of the original graphics data is to be reduced. This may be because the predetermined hardware specifications have a lower capability than the first device (e.g. reduced processing capability and/or reduced storage capability) and/or because one or more of the hardware specifications correspond to particular mode for a content item that is associated with a greater computational overhead when generating image data for display (such as a virtual reality mode or augmented really mode).

In some examples, each of the plurality of predetermined hardware specifications has a lower capability than the first device. An example of this is where the storage circuitry 210 stores graphics data that has been created for use with the Sony® PlayStation 5® and a first predetermined hardware specification corresponds to the Sony® PlayStation 4® and a second predetermined hardware specification corresponds to the Nintendo Switch®.

In some examples, one or more of the predetermined hardware specifications may correspond to an head-mountable display type device (HMD) or a system including an HMD (e.g. a system comprising a Sony® PlayStation 5® and a PlayStation VR®). When generating images for display by an HMD both a left and right image frames are generated, thus requiring a greater amount of processing compared to generating a single image for display by a conventional monitor. Therefore, whilst graphics data that has been created for a given processing device (e.g. a given game console) can be processed by that device to generate image frames for display by a conventional output device, processing of the graphics data by that device to generate image frames for display by an HMD requires more complex processing. Consequently, in some examples one or more of the predetermined quality levels corresponds to a hardware specification associated with an HMD, and the predetermined quality level defines one or more properties for one or more aspects of the graphics data so that a quality can be reduced to improve usability of the graphics data by a system including an HMD. Hence more generally, in some embodiments of the disclosure at least one of the plurality of predetermined quality levels corresponds to a predetermined hardware specification including head-mountable display (HMD) and the first device for which the stored graphics data has been created is optionally a game console.

The control circuitry 230 can be configured to reduce a quality of an aspect of the graphics data according to any of the plurality of predetermined quality levels to thereby improve usability of the graphics data by another device having a hardware specification corresponding to one of the plurality of predetermined hardware specifications. For example, a file may be stored by the data processing apparatus 200 and may comprise a plurality of predetermined quality levels and a predetermined hardware specification associated with each predetermined quality level. The data processing apparatus 200 can thus use a comparison of the received device information and the predetermined hardware specifications to identify a predetermined hardware specification that corresponds to the received device information and on that basis identify a predetermined quality level for use when generating the modified graphics data, in which the identified predetermined quality level specifies one or more properties for one or more aspects of the graphics data so that at least one aspect can be reduced in quality using identified predetermined quality level.

The plurality of predetermined quality levels comprises at least a first predetermined quality level corresponding to a first predetermined hardware specification and a second predetermined quality level corresponding to a second predetermined hardware specification. For example, the first predetermined hardware specification may be a specification having a higher processing capability than the second predetermined hardware specification, in which case the first predetermined quality level defines a higher quality level for the at least one aspect than the second predetermined quality level.

Therefore, in response to receiving second device information indicating that the second device corresponds to one of the predetermined hardware specifications, the predetermined quality level associated with that predetermined hardware specification can be selected for use by the control circuitry 230 when reducing the quality of the aspect of the graphics data so as to modify the graphics data appropriately for the second device using the predetermined quality level.

For example, the initial graphics data (also referred to above as the original graphics data) may have been created for use with the Sony® PlayStation 5® entertainment device, and the plurality of predetermined quality levels for the at least one aspect may comprise a first predetermined quality level corresponding to a first predetermined hardware specification (e.g. the Sony® PlayStation 4® entertainment device) and a second predetermined quality level corresponding to a second predetermined hardware specification (e.g. the Sony® PlayStation 3® entertainment device). Whilst the above example refers to game consoles made by a same manufacturer, in some cases the plurality of predetermined quality levels may correspond to respective predetermined hardware specifications made by different manufacturers and may optionally have different computing platforms. More generally, the plurality of predetermined quality levels may correspond to respective predetermined hardware specifications such as one or more from the list consisting of: PS5®, PS4®, PS3®, P52®, PSVR®, Xbox One®, Xbox Series X®, Nintendo Switch® and so on.

The control circuitry 230 reduces the quality of one or more aspects of the graphics data according to a predetermined quality level from the plurality of predetermined quality levels, in which the predetermined quality level is identified in dependence upon the second device information, the second device information indicative of at least one of: a predetermined hardware specification; and one or more hardware properties for the second device.

The second device information may in some cases directly indicate a given hardware specification corresponding to one of the predetermined hardware specifications, in which case one of the predetermined hardware specifications can be readily identified. For example, the second device information may indicate a name and/or model (e.g. PS4®) associated with the second device and/or a name associated with one or more processors of the second device. In some examples, the second device information may comprise a configuration file specifying the hardware platform. Consequently, the second device information can in some cases directly indicate one of the plurality of predetermined hardware specifications and the control circuitry 230 can be configured to reduce a quality of at least one aspect of the graphics data according to the predetermined quality level that corresponds to the predetermined hardware specification.

Alternatively or in addition, the second device information may indicate one or more hardware properties of the second device, and the data processing apparatus 200 may identify whether any of the plurality of predetermined hardware specifications match the second device on the basis of one or more of the hardware properties. Techniques for identifying a predetermined quality level from the plurality of predetermined quality levels on the basis of one or more hardware properties of the second device will now be discussed.

Computer hardware specifications are technical descriptions of one or more hardware properties of a processing device, such as components and capabilities. Examples of hardware properties indicated by the second device information include one or more from the list consisting of: processor speed; processor type; bus bandwidth (e.g. GPU memory bus bandwidth); bus width; random access memory size; hard disk size; operating system; and hard disk available space. As explained below, using the second device information indicative of one or more hardware properties, the data processing apparatus 200 can identify the second device as corresponding to one of the predetermined hardware specifications for which the data processing apparatus 200 is capable of adjusting graphics data.

In some embodiments of the disclosure, the second device information is indicative of an available storage space associated with the second device, and wherein the control circuitry 230 is configured to reduce a quality of the at least one aspect of the graphics data according to a predetermined quality level to obtain the modified graphics data for which a data size is equal to or smaller than the available storage space. In some cases, the second device information may indicate an amount of storage space which is available (in other words a currently available storage space) for storing the graphics data to be received from the data processing apparatus 200. For example, in the case of the Sony® PlayStation5®, the 825 gigabyte SSD is used to store various data such that only a portion of the SSD is available storage space that can be used for storage of a content item such as a video game. Hence more generally, not all of a memory may be available for storing the graphics data to be received from the data processing apparatus 200 and a portion of the available memory can be indicated by the information received by the receiving circuitry 210.

The data processing apparatus 200 can be configured to identify a predetermined quality level from the plurality of predetermined quality levels in dependence upon the indicated available storage space and to reduce a quality of the graphics data in accordance with the identified predetermined quality level to thereby reduce a data size of the graphics data to an extent that the modified graphics data has a data size that is less than or equal to the available storage space for the second device.

In addition to defining one or more properties associated with a first aspect of the graphics data, at least some of the predetermined quality levels may also define a maximum data size for the graphics data so that when the control circuitry 230 reduces a quality of the graphics data according to a respective predetermined quality level the resultant modified graphics data has a data size that is equal to or smaller than the defined maximum data size for that quality level. For example, a given predetermined quality level may specify one or more properties for one or more aspects (e.g. a maximum data size or polygon count for a respective mesh and/or a maximum data size or pixel count respective graphical texture) as well as an approximate total data size for the resultant modified graphics data. In response to the indicated available storage space, a respective predetermined quality level for obtaining a data size for the modified graphics data that is equal to or less than the indicated available storage space is selected for use by the control circuitry 230. In this way, a respective predetermined quality level that allows the data size of the graphics data to be reduced (by lowering a quality of one or more aspects) can be used so that the modified graphics data is capable of being stored by the second device. It will be appreciated that if storage space increases (e.g. because a user deletes an older game), then some or all of the graphics data may be replaced with larger file size equivalents to make use of the newly available space.

Conversely, where a user wishes to download a new game, but there is not enough space for the new game, optionally the second device may detect which games already installed are compatible with the techniques herein, and suggest downloading smaller graphics data sets to replace the existing assets, thereby creating enough space for the new game—typically a user may wish for a new game to display the bets graphics available, but may be content for an older game on their system to reduce the graphics quality.

Similarly optionally, a game may replace graphics for a particular area or level with smaller graphics assets after the level has been played, or after the level has been played and not revisited for a threshold period of time, so that over the course of game play the game assets become smaller as the likelihood of them being used again reduces. Optionally the user of the second device can decide whether and for which compatible games this approach is used.

In the above discussion, the graphics data stored by the storage circuitry 210 may correspond to the graphics data for an entire content (e.g. entire video game) or may correspond to the graphics data for portion of a content, such as an individual level in a video game. Therefore, in some cases the data processing apparatus 200 performs the techniques discussed above and outputs the modified graphics data corresponding to a portion of a content item (e.g. a specific level in a video game). This is particularly useful for modern video games which can often have a game file size of more than 50 gigabytes and in some cases may even exceed 100 gigabytes.

In some examples, the initial graphics data for the first device comprises at least first graphics data and second graphics data corresponding to respective portions of the content item, and at least one of the first graphics data and second graphics data can be processed by the control circuitry 230. In this way, the graphics data for a respective level (or scene) within a video game can be selected for processing by the control circuitry 230 rather than processing all of the graphics data for the video game.

Hence more generally, the modified graphics data is graphics data for a videogame, and the data processing apparatus is adapted to output the modified graphics data for inclusion as part of the videogame for download to the second device. The data processing apparatus, or a companion server, may then transmit the videogame with the modified graphics to the second device.

Optionally, the data processing apparatus may also output metadata indicating the size of the modified graphics data and/or individual graphics elements therein (e.g. defining the sizes, or indicating which of a plurality of pre-set resizings has taken place), so that the videogame (which may be coded to assume the default graphics are supplied) can check for this metadata and modify default game asset addresses to reflect the change in sizes, and optionally other settings including graphics settings, accordingly. This may be of particular use when the graphics have been resized or further resized due to storage space constraints on the second device—the video game may optionally assume a (re)size for the graphics data based on the hardware of the second device, but for a given hardware configuration, this assumption may be incorrect if the graphics have been modified (or further modified) in response to a limitation on storage.

Figure 3:
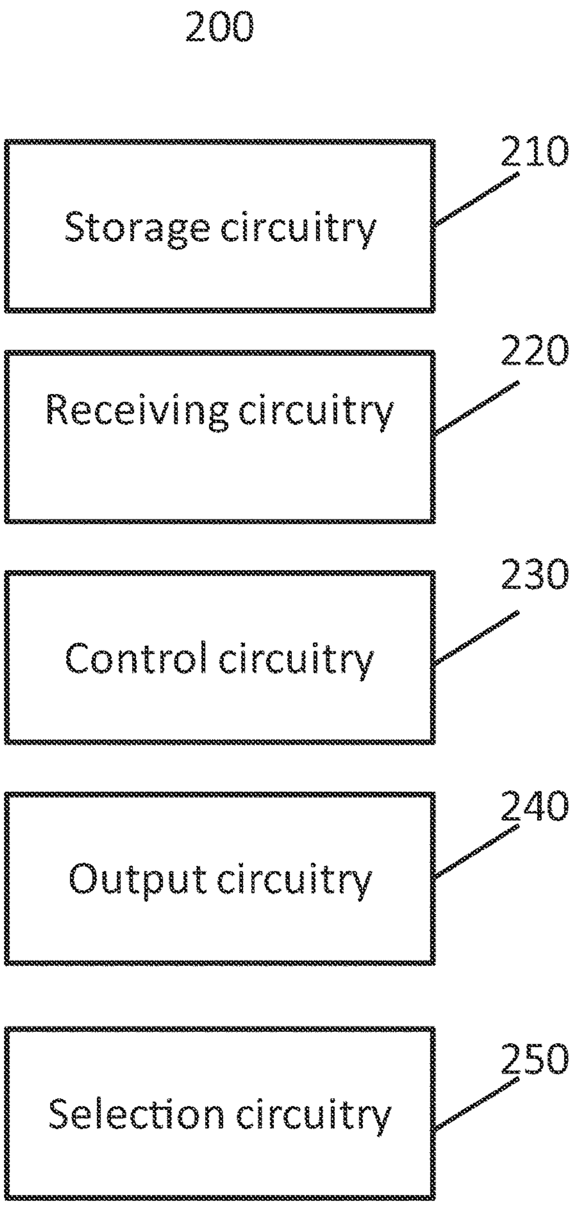
FIG. 3 is a schematic diagram illustrating another data processing apparatus.

Referring now to FIG. 3, in some embodiments of the disclosure the data processing apparatus 200 further comprises selection circuitry 250 to select a predetermined hardware specification from a plurality of predetermined hardware specifications in dependence upon one or more of the hardware properties. In a simplest case, the plurality of predetermined hardware specifications may each specify a storage size of a memory, such that each predetermined hardware specification specifies a different storage size. For example, a first predetermined hardware specification may specify a CPU clock rate of X Hz (e.g. 1.6 GHz in the case of the Sony® PS4®) and a second predetermined hardware specification may specify a CPU clock rate of Y Hz, where Y is not the same as X. In this example, in response to second device information indicative of a CPU clock speed of X Hz, the selection circuitry 250 can select the first predetermined hardware specification so that the predetermined quality level corresponding to the first predetermined hardware specification is used by the control circuitry 230 for reducing the quality. This represents an example where the second device is identified as being one of the predetermined hardware specifications on the basis of a single property indicated by the device information. Other hardware properties may similarly be used and a combination of one or more such hardware properties may be used. It will be appreciated that in this case, the output device requesting the graphics data may not necessarily need to be a device having every hardware property being the same as the predetermined hardware specification and the output device may be able to specify one or more hardware properties to receive the modified graphics data, thereby potentially allowing the graphics data to be received by a device that does not exactly correspond to one of the predetermined hardware specifications.

In embodiments of the disclosure, the selection circuitry 250 is configured to select the predetermined hardware specification in dependence upon whether a predetermined number of hardware properties associated with the predetermined hardware specification match the second device information. In some cases, at least some of the plurality of predetermined hardware specifications may specify a plurality of respective hardware properties. For example, a first predetermined hardware specification may specify a memory size and a CPU architecture and a second predetermined hardware specification may specify the same properties or may instead specify one or more different properties such as a GPU architecture and a maximum supported frame rate. The selection circuitry 250 can compare the received device information with the plurality of predetermined hardware specifications so as to compare the one or more hardware properties for the second device with the hardware properties specified by a predetermined hardware specification, and in response to detecting a match for a predetermined number of the hardware properties associated with a given predetermined hardware specification, the selection circuitry 250 selects the given predetermined hardware specification. For example, certain devices may use a same CPU architecture but may be distinguished due to having different memory types (e.g. SSD or HDD) and/or different GPU speeds, for example. The data processing apparatus 200 can thus store information for a plurality of predetermined hardware specifications and, on the basis of one or more hardware properties specified by the device information received by the receiving circuitry 220, the selection circuitry 250 can select one of the predetermined hardware specifications.

In this way, rather than requiring an output device to provide device information directly indicating a name or model of a hardware specification, the output device can specify one or more hardware capabilities and on this basis the data processing apparatus 200 identifies a predetermined quality level (using the predetermined hardware specification corresponding to that quality level) that is suitable for use by the control circuitry for generating the modified data with a suitable quality for being used by that output device.

Therefore, a respective predetermined quality level of the plurality of predetermined quality levels can be identified based on one or more hardware properties for the second device (also referred to as an output device) by firstly selecting a predetermined hardware specification and then selecting the predetermined quality level corresponding to that predetermined hardware specification.

Techniques for reducing a quality of one or more aspects of graphics data according to a predetermined quality level from a plurality of predetermined quality levels will now be discussed.

The graphics data created for use with the first device comprises mesh data and texture data for generating image data. A wide variety of software packages are available for generating polygonal meshes and textures for use in computer-generated graphics. A polygonal mesh typically comprises vertices, edges and faces, where three vertices connected to each other by three edges define a triangle which is the simplest polygon in Euclidean space. A group of polygons which are connected by shared vertices can thus be used to define a surface of an object. Polygonal modelling techniques allow computer-generated objects to be modelled by representing their surfaces as a plurality of polygons. By mapping various textures to the surfaces of the polygons to add surface details, the generation of realistic-looking computer-generated scenes can be achieved.

In some embodiments of the disclosure, the modified graphics data generated by the control circuitry 230 comprises modified mesh data and/or modified texture data and at least some of the plurality of predetermined quality levels define a threshold associated with at least one of the mesh data and the texture data. Techniques for reducing a quality of mesh data and/or a quality of texture data are now discussed.

In some embodiments of the disclosure, at least some of the plurality of predetermined quality levels define at least one of a threshold resolution for a polygonal mesh and a threshold resolution for a graphical texture. In some embodiments of the disclosure, the control circuitry 230 is configured to reduce a quality of one or more polygonal meshes included in the graphics data according to a predetermined quality level, in which the predetermined quality level defines a threshold resolution for a polygonal mesh. The control circuitry 230 thus performs one or more operations to reduce a resolution of one or more meshes according to the threshold resolution so that a mesh having a resolution greater than the threshold resolution is simplified to have a resolution that is less than or equal to the threshold resolution. Hence, the control circuitry 230 is configured to reduce a resolution of one or more meshes included in the initial graphics data so that the modified graphics data comprises mesh data for which the meshes have a resolution that is less than or equal to the threshold resolution. In this way, polygonal meshes with a smaller number of polygons and vertices, and thus having a reduced processing overhead, can be obtained for output to the second device.

The control circuitry 230 can use any suitable mesh reduction technique for reducing the number of polygons in a mesh. Any known mesh simplification algorithm can be used by the control circuitry 230. Simplification of a polygonal mesh can be implemented using vertex-removal techniques and edge-collapse techniques to provide a simplified mesh having a smaller number of vertices and faces than the input mesh.

It will be appreciated that in some cases, each mesh included in the initial graphics data may be reduced by the control circuitry 230 and in other cases some (a portion) of the meshes included in the initial graphics data may already have a resolution that is less than or equal to the threshold resolution and as such are not reduced by the control circuitry 230. Moreover, in the case where the modified graphics data is output to a receiving device having a hardware specification that is significantly lower than that of the first device for which the graphics data has been originally created, it may be the case that each mesh is reduced to obtain the modified graphics data. In some examples, the control circuitry 230 selects one or more meshes in dependence upon whether a mesh resolution is greater than the threshold resolution and reduces a resolution of the one or more selected meshes so that respective meshes are selected for reduction and non-selected meshes are not adjusted by the control circuitry 230. In other examples, the control circuitry 230 reduces a resolution of each mesh of the graphics data by scaling down a highest resolution mesh to a mesh resolution less than or equal to the threshold resolution and using a same scaling for each other mesh of the graphics data.

For example, the control circuitry 230 may be configured to reduce a resolution of the highest resolution mesh by a first amount to obtain a mesh resolution less than or equal to the threshold resolution, and also reduce a resolution of each other mesh by a same amount as the first amount. As explained above, a resolution of a polygonal mesh can be reduced using known mesh simplification algorithms to reduce a number of polygons and vertices. In some examples, the control circuitry 230 may reduce the highest resolution mesh by a first amount by removing a given number of polygons and also reduce each other mesh by removing the same number of polygons from each respective mesh. However, in some cases removing a same number of polygons from an already relatively low resolution mesh as a relatively high resolution mesh can be problematic in that the final version of the relatively low resolution mesh is of very low quality with a very small number of polygons. Hence alternatively, the control circuitry 230 may reduce the highest resolution mesh by a first amount by removing a given number of polygons, calculating a ratio of the number of polygons in the initial version of the highest resolution mesh to the number of polygons in the final version (reduced version) of the highest resolution mesh, and reducing each other mesh according to the calculated ratio. For example, when halving a resolution of the highest resolution mesh, each of the other meshes may also be halved in resolution. This can be beneficial in that the obtained modified data comprises meshes each having a resolution that is less than or equal to the threshold resolution, and the meshes have a same relative resolution (relative to each other) as the original graphics data and therefore a same relative processing over head.

In some embodiments of the disclosure, the control circuitry 230 is configured to reduce a resolution of one or more polygonal meshes included in the graphics data according to the predetermined quality level to reduce the resolution to be substantially the same as the threshold resolution defined by the predetermined quality level. The threshold resolution defined by a predetermined quality level may correspond to a maximum mesh resolution for a given hardware specification. Hence, one or more high resolution meshes in the original graphics data having a resolution greater than the threshold resolution defined by the predetermined quality level can be simplified (or decimated) to an extent that the resolution is substantially the same as the threshold resolution.

The control circuitry 230 can thus produce the modified graphics data for output to a device for which device information has been received by the receiving circuitry 220 so that the modified graphics data comprises mesh data including one or more meshes having a mesh resolution substantially equal to the maximum mesh resolution for a given hardware specification. In this way, the graphics data can be modified for output to a receiving device so that meshes which are either not capable of being processed by the receiving device or are not capable of being processed within a given time constraint (e.g. processed to achieve a given target frame rate) can be reduced to the maximum mesh resolution specified by the data processing apparatus 200 for the receiving device and usability of the graphics data with the receiving device is improved.

In some embodiments of the disclosure, at least some of the plurality of predetermined quality levels define a threshold resolution for a polygonal mesh including one or more of a threshold polygon count and a threshold vertex count for a polygonal mesh. The plurality of predetermined quality levels can comprise: a first predetermined quality level defining a first threshold polygon count (e.g. N polygons per mesh) and/or a first threshold vertex count (e.g. M vertices per mesh); and a second predetermined quality level defining a second threshold polygon count (e.g. Y polygons per mesh) and/or a first threshold vertex count (e.g. Z vertices per mesh). The respective predetermined quality levels correspond to different predetermined hardware specifications. As such, a respective predetermined quality level can be identified for use in reducing the graphics data for a given receiving device and at least one of a threshold polygon count and a threshold vertex count specified by the predetermined quality level is used so that mesh reduction processing is performed to obtain modified mesh data for which each mesh satisfies the threshold.

In some embodiments of the disclosure, the control circuitry 230 is configured to reduce a quality of one or more textures included in the graphics data according to a predetermined quality level, in which the predetermined quality level defines a threshold resolution for a texture. In a manner similar to that described above with reference to polygonal meshes, the control circuitry 230 can perform processing to reduce a resolution of one or more textures so that a processing overhead associated with one or more of the textures is reduced. The control circuitry 230 performs one or more operations to reduce a resolution of one or more textures of the graphics data according to the threshold resolution so that a texture having a resolution greater than the threshold resolution is modified to have a resolution that is less than or equal to the threshold resolution. Hence, the control circuitry 230 is configured to reduce a resolution of one or more textures included in the initial graphics data so that the modified graphics data generated control circuitry 230 by the comprises texture data for which the textures have a resolution that is less than or equal to the threshold resolution. In this way, a maximum texture resolution for the textures included in the modified graphics data can be controlled. For example, a threshold resolution for a texture can be set for a given hardware specification on the basis of one or more properties associated with one or more memories and/or one or more memory busses associated with the given hardware specification.

The control circuitry 230 performs one or more operations to reduce a resolution of one or more textures of the graphics data to reduce a number of pixels for a texture. For example, the original graphics data may comprise one or more 4096×4096 textures, and the control circuitry 230 can be configured to reduce a quality of one or more textures included in the graphics data according to a predetermined quality level and thereby obtain one or more 2048×2048 textures (or one or more 1024×1024 textures). It will be appreciated that the one or more textures may or may not have a 1:1 square ratio (e.g. a 1:1 ratio, or a 2:1 ratio or a 3:1 ratio). At least some of the predetermined quality levels may specify a threshold resolution for a texture by specifying at least one of: a threshold number of pixels for a respective texture (total number of pixels per texture); a threshold number of horizontal pixels; and a threshold number of vertical pixels. The control circuitry 230 can reduce a resolution of one or more textures of the graphics data in accordance with the identified predetermined quality level so that the modified graphics data comprises textures having a resolution that is less than or equal to the threshold texture resolution defined by the predetermined quality level. In a manner similar to that described above with respect to polygonal meshes, reducing the texture resolution of the graphics data may or may not involve reducing a resolution of all of the textures included in the graphics data, as at least some textures may satisfy the threshold condition specified by the predetermined quality level without requiring a reduction.

In some embodiments of the disclosure, the control circuitry 230 is configured to reduce a resolution of one or more textures included in the graphics data according to the predetermined quality level to reduce the resolution to be substantially the same as the threshold resolution defined by the predetermined quality level. One or more high resolution textures included in the original graphics data can be reduced in resolution to an extent that the texture resolution is the same as (or substantially the same as) the threshold texture resolution defined by the predetermined quality level.

The above discussion refers to the use of a predetermined quality level defining a threshold resolution for a respective mesh or a respective texture, so that each mesh or texture in the modified graphics data has a resolution that is less than or equal to the threshold resolution. In the following discussion, at least some of the plurality of predetermined quality levels define one or more thresholds for a scene so that two or more meshes for a scene and/or two or more textures for a scene can be collectively modified by the control circuitry 230 to satisfy the threshold for the scene.

In some embodiments of the disclosure, at least some of the plurality of predetermined quality levels define at least one of a threshold polygon count for a scene and a threshold vertex count for a scene. A threshold polygon count for a scene and/or a threshold vertex count for a scene may be used by the control circuitry 230 to reduce a resolution of two or more meshes corresponding to a same scene. For example, for a scene comprising a single high resolution mesh the single mesh may have a polygon count that is less than the threshold and can thus be left unchanged, whereas for a scene comprising a plurality of high resolution meshes the total polygon count exceeds the threshold polygon count and at least some of the meshes are processed by the control circuitry 230 to reduce the polygon count. In this way, the graphics data can be selectively modified for respective scenes so as to preserve the quality for certain scenes when appropriate and to reduce the quality for other scenes.

Hence, the graphics data can be modified for output to a receiving device so that a scene which otherwise may not be capable of being processed within a given time constraint (e.g. processed to achieve a given target frame rate) can be reduced in quality by reducing a resolution of at least some of the meshes in the scene according to the threshold polygon count for the scene and/or the threshold vertex count for the scene specified by the predetermined quality level identified for the receiving device.

The meshes for a same scene can be reduced by either reducing the meshes to a substantially same extent to satisfy the threshold polygon count or threshold vertex count for the scene (as discussed previously), or by treating some meshes in the scene differently to other meshes in the scene to satisfy the threshold for the scene.

In some embodiments of the disclosure, the control circuitry 230 is configured to reduce a resolution of at least some of a plurality of polygonal meshes for a same scene according to the predetermined quality level. The threshold polygon count for a scene may for example specify a number of polygons, and a resolution of each of the meshes associated with a same scene can be reduced so that the total number of polygons for the scene is less than or equal to the threshold polygon count. Alternatively, rather than applying a mesh reduction for each mesh in the scene, one or more meshes in the scene may be reduced in resolution whilst one or more other meshes in the scene are left unchanged or reduced to a lesser extent. One or more properties associated with a respective mesh in the scene may be used to determine whether to reduce a resolution of the mesh. For example, properties such as a data size of a respective mesh or geometric size for a respective mesh can be used for selecting meshes to be reduced for a given scene. For example, meshes having a larger data size my be subjected to a greater amount of mesh simplification than meshes having a smaller data size, as reducing a mesh already having a small data size may not be sufficient to satisfy the threshold and many meshes having a small data size may have to be reduced requiring a larger number of mesh reduction operations. In addition, reducing a mesh having a large data size by a given amount will typically be less noticeable than reducing an already low detail mesh by that same amount. Alternatively or in addition, metadata associated with each mesh for the scene may be used, and meshes corresponding to certain object types may be preferentially selected for mesh reduction. An example of this is selecting meshes corresponding to background object types such as landscape features for mesh reduction whilst preferentially not selecting meshes corresponding to object types such as avatars or other in-game characters.

In some embodiments of the disclosure, the control circuitry 230 is configured to reduce a resolution of a given mesh of the plurality of polygonal meshes for the same scene in dependence upon a positon of the given mesh with respect to the scene. As explained above, a plurality of meshes corresponding to a same scene can be treated by the control circuitry 230 as a collective so as to reduce the total number of polygons in the plurality of meshes to be less than or equal to a threshold specified for a scene by the predetermined quality level. A position of a mesh with respect to the scene, such as a depth with respect to the scene or a proximity of the mesh with respect to a virtual camera viewpoint for the scene, can be used to determine an extent to which the resolution is reduced. The position of a mesh with respect to the scene provides an indication of a visual importance of the mesh for the scene. A mesh located in the foreground portion of a scene is typically expected to be of greater visual importance than a mesh located in a background portion of the scene. Similar, a mesh located in the central portion of an image of a scene is typically expected to be of greater visual importance than a mesh located in a peripheral portion of the image of the scene. The control circuitry 230 can thus be configured to reduce a polygon count for a first mesh in a scene by a first amount in dependence upon a position of the first mesh for the scene and to reduce a polygon count for a second mesh in the scene by a second amount different to the first amount in dependence upon a position of the second mesh.

In some embodiments of the disclosure, at least some of the plurality of predetermined quality levels define a threshold data size of texture data for a scene. For example, for a scene comprising a single high resolution texture, the single texture may have a data size that is less than the threshold data size set for a scene and the single texture can thus be left unchanged. Conversely, for a scene comprising a plurality of high resolution textures, the total data size for the textures exceeds the threshold data size for the scene and at least some of the textures are processed by the control circuitry 230 to reduce the texture resolution. In this way, the graphics data can be selectively modified for respective scenes so as to preserve the quality for certain scenes when appropriate and to reduce the quality for other scenes.

The control circuitry 230 can modify the original graphics data to obtain modified graphics data comprising modified texture data and optionally modified mesh data. The modified texture data comprises a plurality of textures for a scene. The control circuitry 230 obtains the modified graphics data by reducing a quality of one or more textures from a plurality of textures for a scene such that a data size for the modified texture data is less than or equal to the threshold data size defined by the predetermined quality level. In some examples, the control circuitry 230 is configured to reduce a resolution of one or more textures for a scene according to the predetermined quality level so that a data size for the modified texture data is substantially the same as the threshold data size.

In a manner similar to that described above with respect to polygonal meshes, the control circuitry 230 the control circuitry 230 can be configured to reduce a resolution of a given texture of the plurality of textures for a same scene in dependence upon a positon of the given texture with respect to the scene. A position of a texture with respect to the scene, such as a depth with respect to the scene or a proximity of the mesh with respect to a virtual camera viewpoint for the scene, can be used to determine whether to reduce a resolution of the texture and an extent to which the resolution is reduced. In a manner similar to that described above, a position of the texture (or a position of mesh to which the texture is to be applied) with respect to the scene can provide an indication of a visual importance of the texture for the scene and a texture having greater visual importance for the scene can be reduced to a lesser extent (or retained in its original form) than a texture having lower visual importance for the scene.

Figure 4:
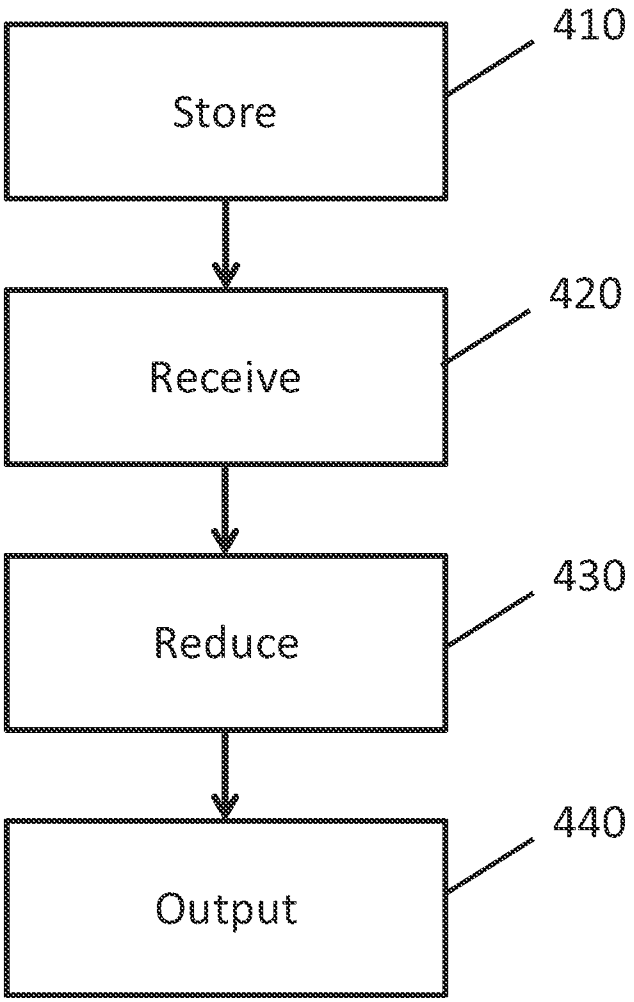
FIG. 4 is a schematic flowchart of a data processing method.

FIG. 4 is a schematic flowchart illustrating a data processing method. The method comprising:

storing (at a step 410) graphics data for a first device;

receiving (at a step 420) second device information indicative of one or more properties for a second device with different capabilities to the first device;

reducing (at a step 430) a quality of at least one aspect of the graphics data in dependence upon the second device information to obtain modified graphics data; and outputting (at a step 440) the modified graphics data, wherein the step of reducing a quality of the at least one aspect comprises reducing a quality of the at least one aspect according to a predetermined quality level from a plurality of predetermined quality levels for the at least one aspect, the predetermined quality level identified in dependence upon the second device information.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus comprising:

a memory comprising computer-executable instructions; and a processor configured to access the memory and execute the computer-executable instructions to perform operations comprising:

storing first graphics data created for a first device having one or more first device properties;

receiving second device information indicative of one or more second device properties for a second device different than the one or more first device properties;

identifying one or more predetermined device properties by comparing the one or more second device properties with one or more stored device properties of a plurality of stored device properties;

identifying, based at least in part on the one or more predetermined device properties, a first predetermined quality level of a plurality of stored predetermined quality levels, wherein each stored predetermined quality level corresponds to one or more different device properties;

modifying a quality of at least one aspect of the first graphics data according to the first predetermined quality level to obtain modified graphics data; and outputting the modified graphics data.

2. The data processing apparatus according to claim 1, wherein each stored predetermined quality levels for the at least one aspect corresponds to a different predetermined hardware specification.

3. The data processing apparatus according to claim 1, wherein at least one of the plurality of stored predetermined quality levels corresponds to a predetermined hardware specification including a head-mountable display (HMD).

4. The data processing apparatus according to claim 1, wherein at least some of the plurality of stored predetermined quality levels define at least one of a threshold resolution for a polygonal mesh and a threshold resolution for a texture.

5. The data processing apparatus according to claim 4, wherein modifying the quality of the at least one aspect of the first graphics data includes reducing a resolution of one or more polygonal meshes included in the first graphics data according to the first predetermined quality level to reduce the resolution to be substantially the same as the threshold resolution defined by the first predetermined quality level.

6. The data processing apparatus according to claim 4, modifying the quality of the at least one aspect of the first graphics data includes reducing a resolution of one or more textures included in the first graphics data according to the first predetermined quality level to reduce the resolution to be substantially the same as the threshold resolution defined by the first predetermined quality level.

7. The data processing apparatus according to claim 1, wherein modifying the quality of the at least one aspect of the first graphics data includes reducing a resolution of at least some of a plurality of polygonal meshes for a same scene according to the first predetermined quality level.

8. The data processing apparatus according to claim 7, wherein modifying the quality of the at least one aspect of the first graphics data includes reducing a resolution of a given mesh of the plurality of polygonal meshes for the same scene in dependence upon a position of the given mesh with respect to the scene.

9. The data processing apparatus according to claim 1, wherein the second device information is indicative of one or more hardware properties for the second device.

10. The data processing apparatus according to claim 9, wherein:

the second device information is indicative of an available storage space associated with the second device; and modifying the quality of the at least one aspect of the first graphics data includes reducing a quality of the at least one aspect of the first graphics data according to the first predetermined quality level to obtain the modified graphics data for which a data size is equal to or smaller than the available storage space.

11. The data processing apparatus according to claim 9, wherein identifying the first predetermined quality level includes selecting a predetermined hardware specification from a plurality of predetermined hardware specifications in dependence upon one or more of the hardware properties.

12. The data processing apparatus according to claim 11, wherein selecting the predetermined hardware specification is based at least in part on whether a predetermined number of hardware properties associated with the predetermined hardware specification match the second device information.

13. The data processing apparatus according to claim 1, in wherein:

the first graphics data and modified graphics data are graphics data for a videogame; and the outputting the modified graphics data includes outputting the modified graphics data for inclusion as part of the videogame for download to the second device.

14. A data processing method comprising:

storing first graphics data created for a first device having one or more first device properties;

receiving second device information indicative of one or more second device properties for a second device different than the one or more first device properties;

identifying one or more predetermined device properties by comparing the one or more second device properties with one or more stored device properties of a plurality of stored device properties;

identifying, based at least in part on the one or more predetermined device properties, a first predetermined quality level of a plurality of stored predetermined quality levels, wherein each stored predetermined quality level corresponds to one or more different device properties;

modifying a quality of at least one aspect of the first graphics data according to the first predetermined quality level to obtain modified graphics data; and outputting the modified graphics data.

15. The data processing method of claim 14, wherein:

the first graphics data includes a virtual scene including a foreground virtual object and a background virtual object; and modifying the quality of the at least one aspect of the first graphics data includes modifying a first geometry data of the background virtual object relative to a second geometry data of the foreground virtual object to generate a modified virtual scene.

16. The data processing method of claim 15, wherein the first predetermined quality level includes a total geometry data threshold, and the method further comprises:

determining a total object geometry data of the modified virtual scene; and determining that the total object geometry data satisfies the total geometry data threshold.

17. The data processing method of claim 16, wherein the total geometry data threshold includes at least one of a total polygon count threshold for the modified virtual scene, a total vertex count threshold for the modified virtual scene, or a total data size threshold of texture data for the virtual scene.

18. The data processing method of claim 14, wherein:

the first graphics data includes a virtual scene including a first virtual object at a central position in the virtual scene and a second virtual object at a peripheral position in the virtual scene; and modifying the quality of the at least one aspect of the first graphics data includes modifying a first geometry data of the second virtual object relative to a second geometry data of the first virtual object generate a modified virtual scene.

19. A non-transitory, computer readable storage medium computer-executable instructions that, when executed by one or more processors of an electronic device, cause the electronic device to perform operations comprising:

storing first graphics data created for a first device having one or more first device properties;

receiving second device information indicative of one or more second device properties for a second device different than the one or more first device properties;

identifying one or more predetermined device properties by comparing the one or more second device properties with one or more stored device properties of a plurality of stored device properties;

identifying, based at least in part on the one or more predetermined device properties, a first predetermined quality level of a plurality of stored predetermined quality levels, wherein each stored predetermined quality level corresponds to one or more different device properties;

modifying a quality of at least one aspect of the first graphics data according to the first predetermined quality level to obtain modified graphics data; and outputting the modified graphics data.

* * * * *